United States Patent
Mheidle

(10) Patent No.: US 9,758,687 B2
(45) Date of Patent: Sep. 12, 2017

(54) RHEOLOGY MODIFIED INK AND PRINTING PROCESS

(76) Inventor: Mickael Mheidle, Pratteln (CH)

( * ) Notice: Subject to any disclaimer, the term of this patent is extended or adjusted under 35 U.S.C. 154(b) by 825 days.

(21) Appl. No.: 13/147,781

(22) PCT Filed: Dec. 21, 2010

(86) PCT No.: PCT/CH2010/000327
§ 371 (c)(1),
(2), (4) Date: Aug. 3, 2011

(87) PCT Pub. No.: WO2011/079402
PCT Pub. Date: Jul. 7, 2011

(65) Prior Publication Data
US 2012/0021192 A1 Jan. 26, 2012

Related U.S. Application Data

(60) Provisional application No. 61/290,658, filed on Dec. 29, 2009.

(51) Int. Cl.
| | | |
|---|---|---|
| C09D 11/40 | (2014.01) | |
| C09D 11/30 | (2014.01) | |
| C09D 11/38 | (2014.01) | |

(52) U.S. Cl.
CPC .............. C09D 11/40 (2013.01); C09D 11/30 (2013.01); C09D 11/38 (2013.01); Y10T 428/24802 (2015.01)

(58) Field of Classification Search
CPC ......... C09D 11/30; C09D 11/40; C09D 11/38; Y10T 428/24802
USPC ....................................................... 523/160
See application file for complete search history.

(56) References Cited

U.S. PATENT DOCUMENTS

| | | | | |
|---|---|---|---|---|
| 3,816,275 A | * | 6/1974 | Ichiki et al. .................. 588/303 | |
| 4,384,096 A | | 5/1983 | Sonnabend | |
| 4,620,875 A | * | 11/1986 | Shimada et al. ........... 106/31.51 | |
| 5,013,629 A | * | 5/1991 | Sekine et al. ................. 430/138 | |
| 5,085,698 A | * | 2/1992 | Ma ...................... C09D 11/326 524/388 | |
| 5,106,417 A | * | 4/1992 | Hauser ................. C09D 11/326 106/476 | |
| 5,281,261 A | * | 1/1994 | Lin ............................. 106/31.65 | |
| 5,409,715 A | * | 4/1995 | Meyers ............................. 426/5 | |
| 5,501,937 A | * | 3/1996 | Matsumoto et al. ......... 430/200 | |
| 5,545,504 A | * | 8/1996 | Keoshkerian et al. .. 430/137.17 | |
| 5,693,126 A | * | 12/1997 | Ito .............................. 106/31.61 | |
| 5,973,026 A | * | 10/1999 | Burns et al. .................. 523/160 | |
| 6,103,041 A | * | 8/2000 | Wagner ............... B41M 5/0023 156/230 | |
| 6,511,142 B1 | * | 1/2003 | Carmon .............. B41J 2/17513 222/147 | |
| 7,189,766 B2 | | 3/2007 | Takahashi et al. | |
| 7,368,487 B2 | | 5/2008 | Wu et al. | |
| 7,434,899 B2 | | 10/2008 | Nakajima | |
| 2002/0165313 A1 | | 11/2002 | Tanzer et al. | |
| 2005/0039635 A1 | | 2/2005 | Yang et al. | |
| 2006/0173095 A1 | * | 8/2006 | Watanabe et al. ............ 523/161 | |
| 2008/0000385 A1 | * | 1/2008 | Moss ..................... C09D 11/36 106/31.27 | |
| 2008/0292570 A1 | * | 11/2008 | Bauer et al. ..................... 424/63 | |
| 2008/0318833 A1 | * | 12/2008 | Jermann .................. A61K 8/35 512/2 | |
| 2009/0226386 A1 | * | 9/2009 | Brillouet ................ A61K 8/732 424/59 | |

FOREIGN PATENT DOCUMENTS

| | | | | |
|---|---|---|---|---|
| GB | 2422610 A | | 8/2006 | |
| JP | 2003-089762 | | 3/2003 | |
| JP | 2003-192957 | | 7/2003 | |
| WO | 9603466 A1 | | 2/1996 | |
| WO | WO 2006/047393 | * | 5/2006 | ............... C08F 2/38 |
| WO | 2009104042 A1 | | 8/2009 | |
| WO | WO 2010/059562 | * | 5/2010 | ............. C09D 11/08 |

OTHER PUBLICATIONS

Richard J. Lewis, Sr. "Hawley's Condensed Chemical Dictionary, 12th Edition", John Wiley & Sons, Inc., New York p. 917 (1993).*
Lubrizol—New Relase, Oct. 1 2008, pp. 1-2.*
Lubrizol, Asteric Viscosity Modifies, May 2010, The Lubrizol Corporation, pp. 1-25.*

* cited by examiner

*Primary Examiner* — Alexander Kollias
(74) *Attorney, Agent, or Firm* — B. Craig Killough; Barnwell Whaley Patterson & Helms

(57) ABSTRACT

The present invention provides Ink jet printing inks comprising a shear thinning agent as outlined in the specification, ink sets comprising such inks, processes of manufacturing such inks, printing processes using such inks and the use of shear thinning agents in ink jet inks.

17 Claims, No Drawings

2

RHEOLOGY MODIFIED INK AND PRINTING PROCESS

This application is, and Applicant claims the benefit of, a national stage application filing under 35 U.S.C. 371 based on PCT/CH2010/000327, filed Dec. 21, 2010, which claims the benefit of priority from U.S. provisional application Ser. No. 61/290,658, filed Dec. 29, 2009.

FIELD OF THE INVENTION

This invention relates to ink jet printing inks comprising a shear thinning agent, to ink sets comprising such inks, to processes of manufacturing such inks, to printing processes using such inks and to the use of shear thinning agents in ink jet inks.

BACKGROUND OF THE INVENTION

Digital printing allows quick and easy modification of images to be printed. However, the speed of digital printing has generally lagged behind conventional printing processes such as lithographic printing and offset press processes. It is generally accepted that inks for digital printing differ in terms of composition and in terms of specification from inks for analogue printing and from formulations for paints industry. Typically, inks for analogue printing and formulations for paints show high viscosities (up to 3000-6000 cP), high particle size, high amount of colorants, fast drying. As a result of these properties, inks for analogue printing/formulations for paints cannot be pumped, cannot pass fine tubes (diameter 2-20 mm), and therefore clog nozzles of ink jet heads.

There are ongoing efforts to produce faster digital printer hardware. In particular, ink jet printers are improving in speed. Ink jet heads fire at higher frequencies to improve the speed of ink jet printers. The viscosity of jet inks has increased as higher frequency heads are used by ink jet printers.

Ink jet printers have traditionally used inks having a viscosity of below 10 centipoise (cP). For example, many Epson ink jet heads in common use inks having a viscosity of around 3-5 cP at 25° C. However, newer ink jet heads such as those from Aprion, Scitex Vision (Hewlett Packard), Spectra, Xaar, Ricoh, Kyocera and Seiko use inks having viscosity in the range of 7 to 15 cP at 25° C. Newer proposed printers use inks having even higher viscosity. For example, a Printos head uses inks having a range of viscosity between 20-100 cP at 25° C.

The use of higher viscosity inks presents several problems. Thickening agents and glycols are used to increase the viscosity of the ink. These higher viscosity inks comprise, for example, 40% to 45% (by weight) glycol. A higher percentage of glycol necessitates a relatively lower percentage of colorants, such as pigments or dyes, which results in a lower quality printed image, with reduced color vibrancy.

Further, the higher percentage of glycol or similar thickening agents and humectants results in an ink which does not easily dry on the printed surface such paper, plastic or textile when compared to more traditional aqueous inks having a higher percentage of water. The high percentage of glycols or similar agents may require the use of drying hoods or similar hardware to dry the ink after it is printed.

Yet another problem related to high viscosity inks is that the thicker inks require more energy to print the inks. The additional frequency of firing of the printer heads and the requirement of additional energy to force the more viscous ink through the printer heads results in a substantial amount of heat being generated at the print heads. Printers using higher viscosity inks may require a cooling apparatus, such as a circulating water system, that removes heat from the print heads. For example, the newer Printos head is able to fire high viscosity inks of 10-100 cP at 25° C., but a cooling system must be integrated to the printing heads to reduce the temperature of the heads and the inks. This requirement further increases the complexity of the head technology as well as the cost of printers, and the cost of use of the printers.

Thus, it is an object of the present invention is to mitigate at least some of these drawbacks of the state of the art. In particular, there is a need for an ink that will provide higher viscosity inks as needed for high speed ink jet printers. The desired ink should not have high levels materials that are difficult to dry, e.g. glycols. The desired ink should also allow high percentages of colorants to be used in the ink for improved print quality. The ink should reduce heat generation at the print head when compared to other inks of high viscosity.

These objectives are achieved by an ink jet ink as defined in claims 1 and 2. Further aspects of the invention are disclosed in the specification and independent claims, preferred embodiments are disclosed in the specification and the dependent claims.

The present invention will be described in more detail below. It is understood that the various embodiments, preferences and ranges as provided/disclosed in this specification may be combined at will. Further, depending of the specific embodiment, selected definitions, embodiments or ranges may not apply. It is also understood that the term "comprising" shall, in the context of this invention, also include the meaning of "containing" or "consisting of".

The term "liquid" material denotes any material or component that is liquid under ambient conditions, such as water and glycol. The term "solid" material denotes any material or component that is solid under ambient conditions, such as pigments. Solid materials may be present "dispersed", such as pigments, disperse dyes or resins, or "dissolved", such as shear thinning agents. Dissolved materials may be present as a solution (ie. mono-phase), as a micellar solution or as an emulsion (i.e. bi-phase).

The term "print head" is known in the field and particularly denotes an ink jet head of an ink jet printer, such as commercially available from Epson, Aprion, Scitex Vision (Hewlett Packard), Spectra, Xaar, Ricoh, Seiko, Kyocera, Konica-Minolta, Trident, Imaje, Video-Jet, Canon, Memjet, Jemtex, Hitachi, Toshiba Tec.

SUMMARY OF THE PRESENT INVENTION

The present invention is an ink that is useful in ink jet printers, and is liquid at the time of printing. The ink has a relatively high viscosity prior to printing and just after printing. The ink thins as it passes through the head of the ink jet printer in response to shear stress and others constraints applied to the ink by the head of the ink jet printer. The rheology behavior of the ink changes during firing process due to the solicitation and constraints applied to the inks and the viscosity of the ink is reduced as the ink transits through the ink jet head, so the viscosity of the ink is materially decreased within the ink jet head. The ink comprises colorants, a shear thinning agent, and a carrier. The ink may comprise other materials to facilitate printing of the ink. Thus, in a broad sense, the invention provides an ink that is liquid at the time of printing and is suitable for use in ink jet printers, said ink comprising a colorant, a shear thinning agent, and a carrier that is liquid at the time of printing, wherein said ink has a relatively higher viscosity at ambient temperature and prior to entering a print head of an ink jet printer, and wherein a viscosity of said ink is reduced in said print head by application of shear to said shear thinning agent by said print head during printing of said ink.

DETAILED DESCRIPTION OF PREFERRED EMBODIMENTS

In one embodiment, the ink is an ink jet ink that comprises colorant, a carrier, and a shear thinning agent. The ink may be liquid under ambient conditions, and is liquid at the time of printing. The ink of the present invention has a relatively higher viscosity prior to entering the printer head, whereupon the viscosity is lowered as the shear thinning agent encounters shear induced by normal operation of the ink jet printer head. As the ink exits the ink jet printer head, and the shear stress incurred in the printer head is removed from the ink, the viscosity of the ink returns to the relatively higher viscosity. The advantages of the higher viscosity ink on the substrate, for example, reduced absorption and bleeding of the image, are retained, without the necessity of a high percentage of glycols or similar materials that do not dry quickly.

In a further embodiment, the present invention provides an ink jet ink containing (i) one or more liquid or dissolved shear thinning agents in an amount of 0.1-10 wt. %; (ii) one or more colorants in an amount of 0.9-30 wt. %; an aqueous carrier in an amount of 40-99 wt. %. Components (b) and (c) together may also be termed "base ink", while the combination of all components (a), (b) and (c) may be termed "rheology modified ink" (RMI).

The invention shall be explained in further detail below.

In one embodiment, the shear thinning agent is selected from the group of liquid shear thinning agents. In this embodiment, depending on the carrier, the shear thinning agent is present in the aqueous phase, in micelles and/or in a second non-aqueous phase.

In a further embodiment, the shear thinning agent is selected from the group of solid shear thinning agents. In this embodiment, the solid shear thinning agent is partly or fully, preferably fully, dissolved in the inventive ink. In this embodiment, depending on the carrier, the shear thinning agent is present in the aqueous phase, in micelles and/or in a second non-aqueous phase.

The inventive ink contains one or more, for example one, colorant. The term colorant is known in the field, a person skilled in the art is in a position to identify colorants suitable for ink jet inks. In the context of the present invention, the term colorant is used in a broad sense and includes both, pigments and dyes. The term particularly includes pigments commonly used in ink jet inks. The term further includes commonly used dyes in ink jet inks, such as reactive dyes, acid dyes, disperse dyes and sublimation dyes. The invention therefore provides an ink jet ink containing solid colorants, such as pigments, sublimation dyes and disperse dyes. The invention further provides an ink jet ink containing soluble colorants, such as reactive dyes and acid dyes.

The term reactive dye is known in the field, a person skilled in the art is in a position to identify reactive dyes suitable for ink jet inks. Reactive dyes particularly include dyes based on Monochhlorotriazin (MCT) and Vinylsulfone chemistry. The invention thus provides an ink jet ink as described herein, wherein the colorant is a reactive dye selected from the group consisting of monochlortiazin derivatives and vinylsulfone derivatives. A specific example of a reactive dye MCT chemistry is Cibacron Yellow D-6GS.

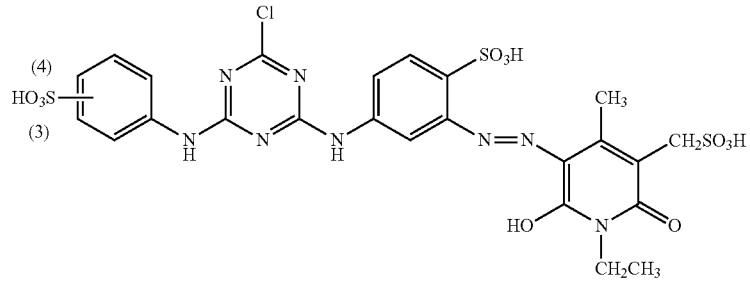

The term acid dye is known in the field, a person skilled in the art is in a position to identify acid dyes suitable for ink jet inks. Acid dyes particularly include all acid and metal complex dyes suitable for silk, polyamid and/or wool. The invention thus provides an ink jet ink as described herein, wherein the colorant is an acid dye selected from the group consisting of acid dyes and metal complex dyes. A specific example of an acid dye is Erionyl 3G from Ciba/Hunstmann

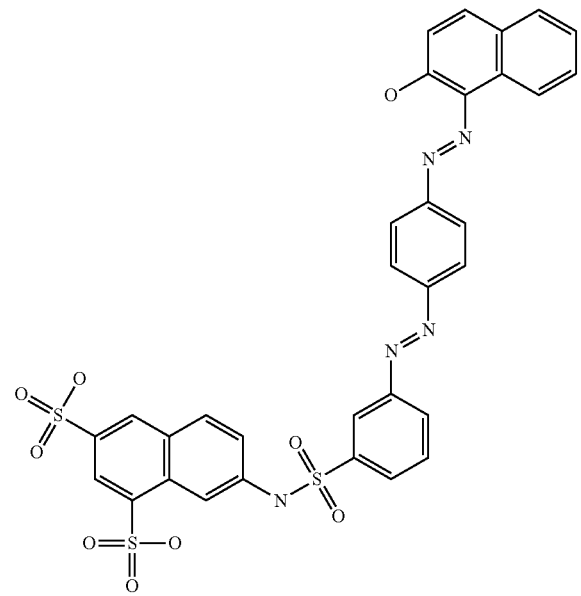 [SMILES: O=S(=O)(O)c1cc(S(=O)(=O)O)c2cc(NS(=O)(=O)c3cccc(/N=N/c4ccc(/N=N/c5c(O)ccc6ccccc56)cc4)c3)ccc2c1]

The term "sublimation dye" is known in the field, a person skilled in the art is in a position to identify sublimation dyes suitable for ink jet inks. Sublimation dyes as used herein include disperse dyes that will sublimate upon the application of heat. Sublimation dyes are heat activated dyes, and other inks, dyes or pigments that will activate upon the application of heat may be used with the invention. Sublimation dyes sublimate upon the application of heat, pressure is typically applied along with heat. The gassification temperature is dependent upon the specific dye solid that is employed, but is typically in a range of 180° C. to 210° C. The gassified sublimation dye has an affinity for polymers, and particularly base materials (substrates) comprising a polyester component. Upon gasification of the sublimation dyes, a printed image may be transferred to an appropriate substrate, due to the affinity of the sublimed or heat activated dye for the substrate. When using heat activated or sublimation colorants, it is not desirable that other components of the ink interfere with the heat activation or sublimation process. High levels of glycol, or other agents, may interfere with heat activation or sublimation, and are not desirable. Sublimation dyes particularly include Y54, M60, Blue 360, Blue 72, Blue 359, Brown 27 and Orange 25. (Named by color index C.I.). The invention thus provides an ink jet ink as described herein, wherein the colorant is a sublimation dye, preferably selected from the group consisting of Y54, M60, Blue 360, Blue 72, Blue 359, Brown 27, Orange 25. A specific example of a sublimation dye is magenta Terasil Red 4BN dye.

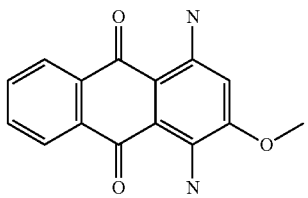 [SMILES: COc1cc(N)c2c(c1N)C(=O)c1ccccc1C2=O]

The inventive ink contains one or more, for example one, shear thinning agent. The term shear thinning agent is known in the field, a person skilled in the art is in a position to identify such agents suitable for ink jet inks. Shear thinning agents belong to the broader class of "rheology modifiers" (RM). Shear thinning agents induce a shear thinning (or rheofluidifiant) property to the inventive compositions, i.e. the viscosity decreases when share effects increase and return to normal viscosity when constraints stop.

In the context of the present invention, the term shear thinning agent is used in a broad sense and includes both, synthetic and natural shear thinning agents. In one embodiment, the shear thinning agent is selected from the group consisting of synthetic polymers, such as poly-acrylates, poly-aminoacrylates, $C_{10-30}$ Alkyl PEG-20 Itaconate Copolymers, hydrophobically modified ethoxylated urethane copolymers, hydrophobically modified ethylene oxide urethanes, polymethacrylates, and tribehenin-PEG-20 esters. In a further embodiment, the shear thinning agent is selected from the group consisting of natural shear thinning agents, such as polysaccharides, hydroxypropyl starch phosphate, and sodium salts of naphthalenesulphonic acid condensation products (e.g. Tamol® NN). The shear thinning agent may be combined with the base ink, e.g. added to an aqueous reactive ink.

The shear thinning agent increases the ambient viscosity of the ink, and may increase the viscosity to, for example, about 10 cP. The selection of the rheology modifier as described with the shear thinning agent, as well as the percentage used, will determine the apparent viscosity of the ink before and after firing process. For example, with 5% of the acrylate/aminoacrylate/c10-30 Alkyl PEG-20 Itaconate Copolymer, the apparent viscosity of the ink can be around 150 cp and can be reduced during passing through the ink jet head to 70 cP. With 1% of the same shear thinning agent, the viscosity will be reduced from 20 cP to 10 cP.

The inventive ink contains an aqueous carrier. The term aqueous carrier (or water based carrier) is known in the field, a person skilled in the art is in a position to identify aqueous carriers suitable for ink jet inks. Aqueous carriers may contain—in addition to water—humectants, biocides, surfactants, viscosity enhancers complexing agents and/or further additives. These components are known to the person skilled in the art. It is also known that certain compounds may fall within more than one of the above groups, for example wetting agents may also have viscosity enhancing properties.

Water particularly includes purified and deionized water.

The term "humectant" (wetting agent) is known in the field, a person skilled in the art is in a position to identify humectants suitable for ink jet inks. Humectants particularly include polyols (such as glycerin, glycol and derivatives thereof) and lactames. Humectants may be added to prevent the ink from drying out and/or from crusting in the printer environment. The invention thus provides an ink jet ink as described herein, wherein the aqueous carrier comprises one or more humectants, preferably selected from the group consisting of 1,2 Propylene glycol and epsilon-Caprolactam.

The term "biocide" is known in the field, a person skilled in the art is in a position to identify biocides suitable for ink jet inks. Biocides particularly include isothiazolinone derivatives, such as MIT; CMIT; BIT; OIT; DCOIT, e.g. Proxel GXL.

The term "surfactant" is known in the field, it particularly includes compounds that reduce surface tension and/or improve dispersion properties. A person skilled in the art is in a position to identify surfactants suitable for ink jet inks. The term includes cationic, anionic, non-ionic and zwitterionic surfactants, particularly with low vapor pressure, such as Surfynol PSA 336.

The term "viscosity enhancer" is known in the field, it particularly includes compounds that increase viscosity. A person skilled in the art is in a position to identify viscosity enhancers suitable for ink jet inks. The term includes glycol and its derivatives, such as (Poly)-ethylenglycol and (Poly)-Propyleneglycol; e.g. 1,2 Propylene glycol.

The term "complexing agent" is known in the field, it particularly includes compounds that have a chelating effect on metal ions. Complexing agents particularly include phosphonates, EDTA and NTA, e.g. trilon M 40% as water sequestrate.

The term "additives" is known in the field, a person skilled in the art is in position to identify further additives, in addition to the additives mentioned above, suitable for ink jet inks. The selection of such additives depends, inter alia, on the intended use of the inventive ink as well the colorant used and include dispersion agents and color fixation agents. A dispersant may be used to disperse or stabilize solid particles, such as solid colorants, in the inventive ink. Suitable dispersants are known in the field and include synthetic polymers, such as acrylic polymers (e.g. Dispex A40 available from Ciba) semi-synthetic polymers, such as sulfonated lignin. A color fixation agent may be used to improve the fixation of the color onto a base material. Suitable color fixation agents are known in the field and include polymers/resins, such as Polyurethane in dispersion, Polyurethane-Acrylate in dispersion, Polyacrylate in dispersion, aliphatic polyesters.

It is understood that the various components identified herein should be compatible with each other. The components therefore should not react with each other ensuring formation of a stable ink jet ink. Particularly, the type of colorant used should not, or not significantly, interfere with the shear thinning agent and/or humectant and/or surfactant. In addition, the selected carrier to dissolve the shear thinning agents must be compatible with other components present in the final ink formulation. Such selections are within the ordinary skill of an expert in the field.

The amount of each component (a) to (c) of the inventive ink may vary over a broad range and may be determined by a person skilled in the art. Advantageously, the amount of shear thinning agent may be in the range of 0.1-10 wt-% preferably 0.5-8 wt. %, particularly preferably 1-3 wt. %. Advantageously, the amount of colorant may be in the range of 0.9-30 wt-%, preferably 2-25 wt. %, particularly preferably 3-20 wt. %. Advantageously, the amount of water may be in the range of 30-99 wt. %, preferably 35-90 wt. %, particularly preferably 38-75 wt. %. Advantageously, the amount of humectant may be in the range of 0-30 wt. %, preferably 10-30 wt %, particularly preferably 10-20 wt. %. Advantageously, the amount of biocides may be in the range of 0-1 wt. %, preferably 0.25-0.5 wt. %. Advantageously, the amount of surfactant may be in the range of 0-10 wt. %, preferably 1-5 wt. %. Advantageously, the amount of viscosity enhancer may be in the range of 0-45 wt. % for an ink having a viscosity of below 15 cP, and in the range of 0-20 wt. % for an in having a viscosity below 5 cP. Advantageously, the amount of complexing agent may be in the range of 0-5 wt. %, preferably 0.1 wt. %. Advantageously, the amount of further additives may be in the range of 0-8 wt. %, preferably 3-8 wt %, particularly preferably 3-5 wt. %.

In a preferred embodiment, the shear thinning agent comprises less than 5 wt. % of the ink formulation. This is a substantial reduction from the 40-45 wt. % of glycols to the usual 20-25 wt. % of glycols that are used in the some ink jet ink formulations for an ink jet ink with a viscosity 3-5 cP at 25° C. The lower percentage of shear thinning agent permits a relatively higher percentage of dye solids to be used in the ink of the present invention, and further, a higher percentage of water may be used in aqueous inks.

In a further preferred embodiment, the invention provides an ink jet ink as disclosed herein, comprising about 5 wt. % shear thinning agent, about 5 wt. % colorant, about 20 wt. % viscosity enhancer (such as glycol), about 70 wt. % water. Such ink has a viscosity of 10 cP. A classical ink jet ink, without the shear thinning agent, comprises 0 wt. % shear thinning agent, about 5 wt. % colorant, about 450 wt. % viscosity enhancer (such as glycol), about 50 wt. % water. Such classical ink also has a viscosity of 10 cP. As can be seen, the amount of viscosity enhancer is significantly reduced while the amount of water is increased. This offers, for example, the possibility to significantly increase the amount of colorants in the inventive ink jet inks.

In a further embodiment, the present invention provides an ink jet ink containing (a) one or more shear thinning agents, preferably in an amount of 0.1-10 wt. %; (b) one or more colorants, preferably in an amount of 0.9-30 wt. %; (c) a carrier, preferably in an amount of 40-99 wt. %, whereby said ink is, with the exception of colorants, free of solid material. According to this embodiment, the base ink does not contain solid materials, i.e. all components of the base ink form a single phase (a solution) or two phases (an emulsion). The colorants may be, as outlined above, either soluble or insoluble. While in the first case, the inventive ink is free of solid material, in the latter case the colorant is solid material.

The ink in the present example is supplied to an ink jet printer. As the ink enters the ink jet head, the ink is forced through the ink jet head and a nozzle of the ink jet printer, using a piezo printer. The pressure on the ink as the ink is forced through the ink jet head by the piezo printer introduces shear stress to the ink generally, and to the shear thinning agent specifically. As shear stress is introduced, the viscosity of the shear thinning agent is reduced, and is no longer acting as a thickening agent because of the rheology behavior of this non-Newtonian liquid. The viscosity of the ink is thereby lowered as the ink passes through the head of the ink jet printer. The viscosity of the ink may be reduced from 10 cP to 5 cP as the ink passes through the nozzle, by way of example. As the ink exits the nozzle, and the shear stress on the ink is removed, the ink returns to the relatively higher viscosity.

The ink may be designed to have a specific viscosity prior to printing and subsequent to printing, and yet another viscosity as the ink passes through the print head of the ink jet printer and the ink is subjected to shear stress or others constraints may involve shearing effects. The specific viscosity prior to printing will be a function of the colorants, the carrier (including humectants, biocides, surfactants), and, importantly, the specific shear thinning agent and the quantity of the shear thinning agent.

The present ink has improved drying characteristics, and is more environmentally friendly in that water, rather than humectants or co-solvents (such as glycols) are evaporated. The higher dye percentage allows for more vibrant color images. At the same time, since viscosity is reduced at the time of printing, the amount of energy used by the piezo printer to print the ink is reduced, which reduces heat that is a by product of the printing process.

In a further embodiment, the invention further provides for inks having improved viscosity properties. Prior to printing (@ a shear rate of 0 $s^{-1}$) the inventive inks may be adjusted to a viscosity of 5-100 cP at 25° C. Advantageously, the ink has a viscosity of not less than 10-15 cP at 25° C. At the time that the ink passes through the ink jet head and is subjected to shear stress, the ink should have a viscosity of not less than 5-7 cP. After the ink passes through the printer head, the ink will return to the ambient viscosity as the ink is no longer subjected to the shear stress. In an advantageous embodiment, the invention provides an ink as described herein having a viscosity of 10-100 cP @ a shear rate of 0 $s^{-1}$ and a viscosity of 5-20 cP @ a shear rate of 200-400 $s^{-1}$. Viscosities as defined herein are measured at 25° C. using standard viscosimeters, such as Brookfield viscosimeters. Viscosities are preferably determined @ 100 rpm for low viscosities (e.g. 0-6 cP) and @50 rpm for higher viscosities (e.g. 6-15 cP).

In all ink jet printers, the inks must pass the nozzles of a printing head which involves pressure on the ink during the firing to succeed dot ejection. The inventive inks are adapted to such process and can therefore be used with all ink jet heads, including piezo-, continuous flow binary-, continuous flow multilevel deflected-, valve jet-, jet- and thermal or bubble jet-ink jet heads. The present invention can be used with ink jet printers having large carriage widths or small carriage widths, such as desk top ink jet printers. The present invention can be used with a wide range of colorants pigments and dyes, including reactive, acid, disperse, sublimation, metal complex, and direct dyes. The present invention can be used with ink jet inks that are liquid at the time of printing, which also includes wax thermal or wax based inks that are melted for printing. In an advantageous embodiment, the invention provides for the use of an ink as described herein in an ink jet printer having a printing head e.g. Epson, Seiko, Xaar, Spectra, Ricoh, Aprion, Printos, Kyocera, Konica-Minolta, Memjet, Imaje, Jemtex, Video-Jet.

By using the shear thinning agents as described herein, it is possible to reduce the total amount of humectants (glycol and wetting agent) to 20-25% in the inventive ink jet inks, compared to 40-45 wt % in classical ink jet inks.

Further, by using the shear thinning agents as described herein, it is possible to reduce drying time, when compared to classical ink jet inks. Without being bound to theory, it is believed this relates to the higher viscosity when in contact with a base material.

Further, by using the shear thinning agents as described herein, it is possible to increase the quality of a print, as the amount of pigments may be increased when compared to classical ink jet inks.

In a further embodiment, the invention provides an ink set comprising at least three blendable inks, wherein one or more, preferably all inks in said set comprise an ink as described herein. In an advantageous embodiment, the invention provides a set as described herein wherein said blendable inks comprise (i) yellow ink, cyan ink, magenta ink, optionally black ink, optionally white ink; or (ii) Yellow, Magenta, Cyan, Black, Orange and Blue; or (iii) CMYK Orange, Blue, Violet and Green ink; or (iv) CMYK Orange, Red, Blue, and Green ink.

In a further embodiment, the invention provides a printed matter comprising (i) a printed base material and (ii) a printing ink as described herein on the surface of the base material. Suitable base materials are known in the field and include paper, carton, plastic, metal and textiles. The printed matter may contain the printing ink in the shape of letters, figures, or symbols; or as a coating.

The reactive dye inks are suitable for cellulosic fibers; the acid dye inks are suitable for silk, polyamide and wool fibers; the sublimation dyes inks and disperse dye inks are compatible with surfaces with polyester as main components; the pigment inks are suitable for all kid of fibers/substances. The invention thus provides (a) a printed matter comprising (i) a printed base material comprising cellulosic fibers and (ii) a printing ink as described herein comprising one or more reactive dyes; or (b) a printed matter comprising (i) a printed base material comprising silk, polyamide and/or wool fibers and (ii) a printing ink as described herein comprising one or more acid dyes; or (c) a printed matter comprising (i) a printed base material comprising polyester as main or sole component and (ii) a printing ink as described herein comprising one or more sublimation dyes; or (d) a printed matter comprising (i) a printed base material comprising polyester as main or sole component and (ii) a printing ink as described herein comprising one or more disperse dyes; or (e) a printed matter comprising (i) a printed base material comprising paper, carton, plastic, metal and textiles and (ii) a printing ink as described herein comprising one or more pigments.

In a further embodiment, the invention provides a method for manufacturing an ink according as described herein. Said method comprises the steps of (i) combining the starting materials (i.e. components of a), b) and c) as defined herein) and (ii) filtering the thus obtained product under pressure. It was found that the components may be combined with a standard mixer or with a high speed disperser. It was further found that the present inks are easy to filter using a filter with pores below 1 micron, e.g. 0.5-1 micron. This comes as a surprise, as current inks with high viscosity formulated with high amounts of Humectants face a huge problem in the filtration process to pass thru very fine filter e.g. 0.5-1 microns. Suitable filters for step (ii) include Polypropylene filters or Fiber-type of filters.

In a further embodiment, the invention provides a method for manufacturing a printed matter as disclosed herein ("a printing process"), comprising the steps of (i) providing a base material and an ink as disclosed herein to an ink jet printer and (ii) printing onto said base material by use of said printer. These methods are known per se, but not yet applied to the specific inks of the present invention. It is considered an advantage that the inventive inks are compatible with known equipment, but enables improved printing processes (such as increased printing speed and/or improved quality). When using the inventive ink comprising one or more sublimation dyes, the printing step (ii) includes direct and indirect printing. In the indirect printing, the sublimation dye inks are printed on a transfer material (e.g. paper) and than transferred to a base material (e.g. polyester) by controlling time and temperature conditions (e.g. 30-45 second at 180-210° C. and pressure needed during the transfer phase). In the direct printing, the sublimation dye inks are printed directly on the base material (e.g. polyester) without the use of transfer material; optionally by applying fixation methods such pressure and/or steam. In one embodiment, to sublimate the inks into the fiber, a transfer press is used under pressure and 45-60 second at 160-190° C. temperature. In one further embodiment, to sublimate the inks into the fiber, steaming 120-180 second at 160° C. is employed. A person skilled in the art may determine appropriate printing parameters by simple serial test.

In a further embodiment, the invention provides the use of (or a method of using) an ink or an ink set as defined herein, for inkjet printing. Consequently, the invention also provides an ink as disclosed herein which is contained within an ink jet printer cartridge.

In a further embodiment, the invention provides the use of (or a method of using) a shear thinning agent as defined herein in an ink, particularly an ink jet ink as disclosed herein. Particularly, the invention provides the use of a shear thinning agent as defined herein in an ink, particularly an inkjet ink containing a colorant selected from the group of sublimation dyes and an aqueous carrier as defined herein. It was surprisingly found that the shear thinning agents disclosed herein are particular suitable for inks containing sublimation dyes. Without being bound to theory, it is believed that this is related to the comparatively low amount of humectants and high amount of water used in the present inks. Consequently, the invention also provides a liquid ink jet ink comprising a shear thinning agent selected from the group consisting of polymethacrylates, tribehenin-PEG-20 esters and hydroxypropyl starch phosphates; optionally a colorant selected from the group of sublimation dyes and/or an aqueous carrier.

To further illustrate the invention, the following examples are provided. These examples are provided with no intent to limit the scope of the invention.

The following ink jet inks are provided after a well defined production protocol, by firstly combining the starting materials as shown in the tables below, mixed with a normal mixer or high speed disperser. In a second step, the initially obtained material is filtered under pressure thru a fine filter of. 0.5-5 microns. The final ink is homogeneous, stable and having well defined physical and chemical specifications; specifically the viscosity at 25° C., the surface tension at 25° C., amount of dyes/pigments defined by spectro-meter and the pH value. In addition, a specific lab control to check the viscosity reduction when share effect applied is also performed under constant temperature (25° C.).

Example A—Reactive Dye Ink

| Product | ITEM | Quantity (kg) | Part (%) |
|---|---|---|---|
| Cc Yellow D-6GS Powder at 100% | Reactive dye | 131 | 13.1 |
| 1,2 PG Propylene glycol | Humectant | 200 | 20.0 |
| E-Caprolactam | Humectant | 50 | 5 |
| Proxel GXL | Biocide | 2.5 | 0.25 |
| Surfinol PSA336 | Surfactant (surface tension) | 10.0 | 1.0 |
| Trilon M 40% | Water complexing agent | 5 | 0.5 |
| Emulium 22 | Shear Thinning Agent | 10 | 1 |
| Water | Carrier | 591.5 | 59.15 |

Example B—Acid Ink

| Product | ITEM | Quantity (kg) | Part (%) |
|---|---|---|---|
| Erionyl 3G Crude Z-Mix at 100% | Acid dye | 88.8 | 8.68 |
| 1,2 PG Propylene glycol | Humectant | 20 | 2.0 |
| E-Caprolactam | Humectant | 250 | 25.5 |
| Proxel GXL | Biocide | 2.5 | 0.25 |
| Surfinol PSA336 | Surfactant (surface tension) | 10.0 | 1.0 |
| Trilon M 40% | Water complexing agent | 5 | 0.5 |
| Emulium 22 | Shear Thinning Agent | 10 | 1 |
| Water | Carrier | 615.7 | 61.57 |

Example C—Disperse Ink

| Product | ITEM | Quantity (kg) | Part (%) |
|---|---|---|---|
| Terasil Navy GRL CR | Disperse dye | 20 | 2.0 |
| Dispex A40 | Dispersing agent | 20 | 2.0 |
| Glycerin 85% | Humectant | 300 | 30.0 |
| Surfynol PSA 336 | Surfactant | 10 | 1.0 |
| Asteric | Rheology modifier Polymethacrylate (PMA) | 30 | 3.0 |
| Proxel GXL | Biocide | 2.8 | 0.28 |
| Water | Carrier | 617.20 | 61.72 |

Example D—Sublimation Ink

| Product | ITEM | Quantity (kg) | Part (%) |
|---|---|---|---|
| Terasil Red 4BN | Sublimation dye | 46.0 | 4.6 |
| Dispex A 40 | Dispersion agent | 32 | 3.2 |
| Glycerin 85% | Humectant | 200 | 20 |
| Proxel GXL | Biocide | 2.5 | 0.25 |
| Surfinol PSA 336 | Surfactant | 10 | 1.0 |
| Asteric | Polymethacrylate (PMA) | 15 | 1.5 |
| Water | Carrier | 694.5 | 69.45 |

Example E—Pigment Ink

| ITEM | Product | Quantity (kg) | Part (%) |
|---|---|---|---|
| Pigment | Chroma Jet Magenta (M122) | 24 | 2.4% |
| Resin/Dispersion agent | Modified Polyacrylate | 17 | 1.7% |
| Asteric | RM Polymethacrylate (PMA) | 10 | 1.0% |
| Humectants | 1,2 PG Propylene glycol | 200 | 20.0% |
| Surfactant | Dowanol DPM | 30 | 3.0% |
| Biocide | Proxel GXL | 2.5 | 0.25% |
| Surfactant | DMEA | 4.8 | 0.48% |
| Carrier | water | 711.7 | 71.17% |

Results: The inks according to the above examples can easily be manufactured and filtered. They showed an initial viscosity of 10 mPas and were found suitable for ink jet printing using Spectra head S-Class SL128, Galaxy or Q-Class. Excellent printing speed, printing quality was observed in these examples; the quantity of the selected RM was adjusted to ensure viscosity reduction during firing process from initial Viscosity 10 cP at 25° C. to 6 cP under firing conditions. All viscosities are measured with a Brookfield DV-II+Pro Viscositymeter (Conee: CPE-42; Cavity: CPE-44PSY). Measurements are made at 25° C.; speed of the cone: 100 RPM for viscosity range de 0-6 cP and Speed of the cone: 50 RPM for viscosity range 6-12 cP and 6-15.

What is claimed is:

1. An ink jet ink that is liquid at the time of printing, comprising:
    a) a liquid or dissolved shear thinning agent in an amount of 0.1 to 10 percent of the ink jet ink by weight, and the liquid or dissolved shear thinning agent is tribehenin-PEG-20 ester;
    b) a colorant in an amount of 0.9 to 30 percent of the ink jet ink by weight; and
    c) an aqueous carrier in an amount of 40 to 99 percent of the ink jet ink by weight, the aqueous carrier comprising:
        water in an amount of 38 to 75 percent of the ink jet ink by weight; and
        an agent selected from the group consisting of humectants, dispersants, biocides, surfactants, complexing agents, and additives;
    the ink jet ink having a viscosity at a temperature of 25° C. of 10-100 cP at a shear rate of 0 s$^{-1}$ and a viscosity of 5-20 cP at a shear rate of 200-400 s$^{-1}$.

2. The ink jet ink according to claim 1, wherein the colorant is selected from the group consisting of insoluble pigments, sublimation dyes and dispersion dyes, soluble reactive dyes and acid dyes.

3. The ink jet ink according to claim 1, wherein the aqueous carrier comprises water and humectants and an agent selected from the group consisting of dispersants, biocides, surfactants, and complexing agents.

4. The ink jet ink according to claim 1, wherein the ink jet ink, with the exception of colorants, is substantially free of solid material.

5. The ink jet ink according to claim 1, wherein the inkjet ink is contained within an inkjet printer cartridge.

6. The ink jet ink according to claim 1, wherein the colorant is selected from the group consisting of colorants that yield a yellow ink, a cyan ink, a magenta ink, and a black ink.

7. The ink jet ink according to claim 1, wherein the colorant is selected from the group consisting of insoluble pigments, sublimation dyes and dispersion dyes or from the group consisting of soluble reactive dyes and acid dyes.

8. The ink jet ink according to claim 1, wherein the colorant is a sublimation dye.

9. An ink set comprising:
   at least three blendable inks, wherein each ink in the ink set comprises the ink jet ink according to claim 1.

10. The ink set according to claim 9, wherein the blendable inks in the ink set comprise:
    (a) yellow ink, cyan ink, magenta ink, optionally black ink, optionally white ink; or
    (b) yellow ink, magenta ink, cyan ink, black ink, orange ink, and blue ink; or
    (c) CMYK orange ink, red ink, blue ink, and green ink; or
    (d) CMYK organic ink, blue ink, violet ink, and green ink.

11. A printed matter comprising:
    (a) a printed base material; and
    (b) the ink jet ink according to claim 1 that is present on the surface of the printed base material.

12. The printed matter according to claim 11, wherein the printed base material is selected from a group consisting of paper, card board, plastic, metal and textiles.

13. The printed matter according to claim 11, wherein the ink jet ink is printed in the shape of a letter, a figure, or a symbol; or the ink jet ink is printed as a coating.

14. A method for manufacturing the ink jet ink according to claim 1 comprising the steps of:
    (i) combining (a), (b) and (c);
    (ii) mixing (a), (b) and (c) with a high speed disperser; and
    (iii) subsequently filtering the ink jet ink under pressure.

15. The method according to claim 14, wherein step (iii) comprises the step of filtering under pressure through a filter having pores below 1 cm.

16. A method for manufacturing printed matter comprising the steps of:
    providing the ink jet ink according to claim 1 to an ink jet printer; and
    providing a base material, and printing the ink jet ink onto the base material by use of the ink jet printer.

17. A method of printing comprising: the step of printing the ink jet ink according to claim 1 by an inkjet printer.

* * * * *